Patented Aug. 8, 1933

UNITED STATES PATENT OFFICE 1,921,424

MEDICINAL REMEDY

Fred P. Nabenhauer, Philadelphia, Pa., assignor to Smith, Kline & French Laboratories, Philadelphia, Pa., a Corporation of Pennsylvania No Drawing. Application March 8, 1930
Serial No. 434,452

8 Claims. (Cl. 167—58)

My invention relates to improvement in medicinal remedy and more particularly to one for use in connection with the treatment of common colds, rose colds, hay fever, sinusitis, nasal catarrh, and in conditions causing congestion of the nasal passages.

In accordance with my invention, I provide a novel remedy for use in the treatment of affections, more particularly of the nasal passages, as indicated, which will be effective to shrink the mucosa and to reduce the size of turbinates, which under the conditions indicated become enlarged and congest the nasal passages.

The novel remedy in accordance with my invention may be readily administered, for example, by the use of a dropper, by spraying, or by direct application, as with a cotton pledget and will be found to be especially advantageous in that it will effect a shrinkage of the mucosa of long duration, say of from two to three hours and further in that it possesses anæsthetic properties which enable its administration without discomfort, as stinging, especially in cases where the membrane is inflamed and sensitive.

The novel remedy in accordance with my invention lends itself to administration in forms of varying activity in that, for example, it may be administered in solution in, for example, an oil, from which it will be relatively slowly released to the tissue and in that it may be administered in, for example, an aqueous solution from which it will be substantially directly released to the tissues. The remedy may be administered in various other forms, though its administration either in solution in oil or in aqueous solution will be preferred.

The medicinal remedy in accordance with my invention comprises a benzyl carbinamine, having the structure

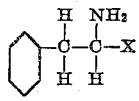

or equivalently a salt thereof. Preferably the benzyl carbinamine will be non-hydroxylated, and may desirably be an alkyl or equivalently an alphyl benzyl carbinamine, or a polybenzyl carbinamine, as dibenzyl carbinamine. The remedy may, for example, comprise benzyl carbinamine, benzyl methyl carbinamine, benzyl ethyl carbinamine, benzyl propyl or isopropyl carbinamine, dibenzyl carbinamine, etc., or salts thereof as hydrochlorides, sulphates, acetates, etc.

As illustrative of the remedy embodying my invention, for example, dibenzyl carbinamine may be graphically indicated as follows:

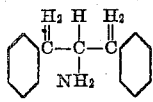

Dibenzyl carbinamine may be prepared by reduction of dibenzyl ketone oxime, as for example, with metallic sodium in alcoholic solution. The oxime may be produced by dissolving the ketone in alcohol, adding a slight excess of hydroxylamine hydrochloride, rendering the solution alkaline and boiling; dibenzyl ketone oxime will be formed and will crystallize out of solution on the addition of water after cooling.

When the dibenzyl ketone oxime has been sufficiently reduced a portion of the alcohol is distilled off, water added and the solution acidified with acetic acid. Then unreduced dibenzyl ketone oxime is separated by filtration and dibenzyl carbinamine is freed from its salt (acetate) by the addition of alkali and extraction with benzene. Pure dibenzyl carbinamine chloride is then freed from the benzene solution with hydrochloric acid and the dibenzylamine hydrochloride converted back to free dibenzyl carbinamine by dissolving the hydrochloride in water, using heat to obtain the desired concentration, and adding an alkali, as caustic soda, or the like to the solution which causes the free dibenzyl carbinamine to separate in the form of an oil, which will solidify on cooling.

The reaction involved in the production of dibenzyl carbinamine may, for example, be graphically illustrated as follows:

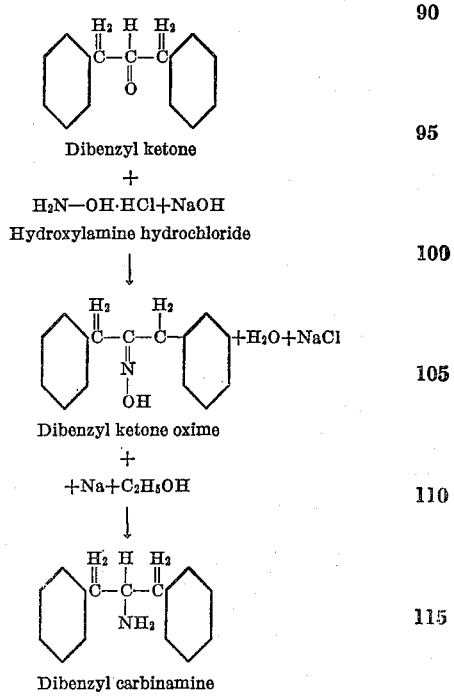

The dibenzylcarbinamine will be found to be a solid having a melting point at about 50° C. and may be prepared for use by dissolving it, for example, in a hydrocarbon oil, as liquid petrolatum, in a vegetable oil, as olive oil, almond oil, or the like, or it may be prepared for use by dissolving one of its salts in water. Solutions of dibenzyl carbinamine may be, if desired, flavored, as with lavender, oil of geranium, oil of neroli, menthol, or other suitable flavoring and if desired may be colored with any suitable coloring matter which will be soluble in the solution to be colored.

As illustrative of the preparation of dibenzyl carbinamine for use in solution in, for example, an oil, hydrocarbon or vegetable, solutions may, for example, be prepared within the ranges given in the following table:

| | Percent |
|---|---|
| Dibenzyl carbinamine | 0.5– 3.0 |
| Oil | 99.5–97 |

Illustrative of a desirable solution for use as indicated, for example, the following formula may be used:

| | Percent |
|---|---|
| Dibenzyl carbinamine | 1.0 |
| Oil | 99.0 |

As has been indicated and as it will be appreciated is contemplated by me, I may use a salt of dibenzyl carbinamine equivalently for the free compound and in general when using a salt, in place of the compound, such will be used in aqueous solution. Thus, I may, for example, utilize dibenzyl carbinamine hydrochloride, which may be graphically indicated as follows:

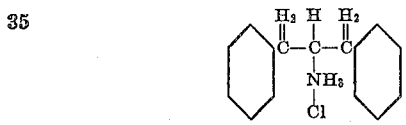

or I may, for example, use dibenzyl carbinamine sulphate, which may be graphically indicated as follows:

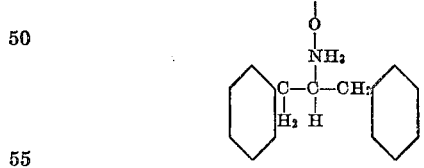

It will be understood that the salts of dibenzyl carbinamine may be readily prepared from the free compound by addition to the compound of desired acid radical which, in the case of the sulphate, for example, may be accomplished by suspending dibenzyl carbinamine in warm water and neutralizing with sulphuric acid. The solid dibenzyl carbinamine sulphate will crystallize out on concentration and cooling. The hydrochloride, acetate, and the like, may be similarly prepared by neutralizing with acetic acid, hydrochloric acid, or the like.

For the purpose of illustrating the use of a salt of dibenzyl carbinamine in aqueous solution, for example, a solution within the ranges shown in the following table may be used:

| | Percent |
|---|---|
| Salt | 0.5– 5.0 |
| Water | 99.5–95.0 |

By way of illustrating a desirable solution, for example, a solution prepared in accordance with the following formula may be used:

| | Percent |
|---|---|
| Salt | 2.0 |
| Water | 98.0 |

It will be appreciated that solutions of a salt of dibenzyl carbinamine may be flavored as desired and likewise may, if desired, be colored.

The various benzyl carbinamines indicated as included within the scope of my invention may be produced in a manner similar to that described above for the production of dibenzyl carbinamine, it being appreciated that in the formula

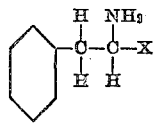

"X" will indicate an alkyl or an alphyl group, as, for example, $CH_3$ for benzyl methyl carbinamine, $C_2H_5$ for benzyl ethyl carbinamine, $C_3H_7$ for the benzyl propyl amines, and that the "X" will include an additional benzene ring or rings for polybenzyl carbinamines. In the preparation of the various carbinamines the corresponding ketone may be used, as benzyl methyl ketone, benzyl ethyl ketone, benzyl propyl ketone, etc. The salts of the various benzyl carbinamines, as the hydrochloride, sulphate, acetate, etc., may be prepared as described above in connection with preparation of the salts of dibenzyl carbinamine.

It will now be understood that my invention contemplates the use of a benzyl carbinamine or equivalently of a salt of a benzyl carbinamine, as the hydrochloride, sulphate, acetate, or the like, for the treatment of the mucosa in conditions such as exist in cases of ordinary cold, hay fever, sinusitis, nasal catarrh, and other conditions of congestion of nasal passages.

Further, I contemplate the use of a benzyl carbinamine or equivalently a salt thereof, in solution in a suitable solvent and more particularly in solution in a suitable hydrocarbon or vegetable oil, or in water, depending upon the activity or rapidity of action desired of the compound, or equivalently of the salt.

It will be understood that a benzyl carbinamine and equivalently a salt thereof, will be high effective to shrink the mucosa and to reduce turbinates, that it will be of special advantage due to its capacity to effect shrinkage of long duration and due to the fact that more particularly in the case of dibenzyl carbinamine anæsthetic properties are possessed which will tend to negative unpleasant effect in administration.

As has been indicated, it will be appreciated that in accordance with my invention, I contemplate a benzyl carbinamine or a salt thereof, as for example, the hydrochloride, sulphate, acetate, etc., to be equivalents and it will be understood that where in the claims appended hereto I mention benzyl carbinamine, or a specific benzyl carbinamine, I intend to include as equivalent thereof the salts of the benzyl carbinamine.

What I claim and desire to protect by Letters Patent is:

1. As a medicinal remedy for local treatment of the mucosa, dibenzyl carbinamine.

2. As a medicinal remedy for local treatment of the mucosa, dibenzyl carbinamine in solution in a solvent therefor to a concentration within about the range 0.5%–5.0%.

3. As a medicinal remedy for local treatment of the mucosa, dibenzyl carbinamine in solution in an oil.

4. As a medicinal remedy for local treatment of the mucosa, dibenzyl carbinamine in solution in an oil to a concentration within about the range 0.5%–3.0%.

5. As a medicinal remedy for local treatment of the mucosa, a salt of dibenzyl carbinamine.

6. As a medicinal remedy for local treatment of the mucosa, dibenzyl carbinamine hydrochloride.

7. As a medicinal remedy for local treatment of the mucosa, a substituted benzyl carbinamine having the formula $$C_6H_5.CH_2.CHX.NH_2,$$

in which X is an alkyl or alphyl group.

8. As a medicinal remedy for local treatment of the mucosa, a substituted benzyl carbinamine having the formula, $$C_6H_5.CH_2.CHX.NH_2,$$

in which X is an alkyl or alphyl group, in solution in an oil.

FRED P. NABENHAUER.